United States Patent
Kiriyama

(10) Patent No.: US 7,307,525 B2
(45) Date of Patent: Dec. 11, 2007

(54) INSTRUCTION DROP-OFF WARNING SYSTEM AND METHOD

(75) Inventor: Hiroaki Kiriyama, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 188 days.

(21) Appl. No.: 10/563,625

(22) PCT Filed: Jul. 14, 2004

(86) PCT No.: PCT/JP2004/010351

§ 371 (c)(1),
(2), (4) Date: Jan. 6, 2006

(87) PCT Pub. No.: WO2005/006096

PCT Pub. Date: Jan. 20, 2005

(65) Prior Publication Data

US 2006/0164244 A1    Jul. 27, 2006

(30) Foreign Application Priority Data

Jul. 15, 2003  (JP) .............................. 2003-197294

(51) Int. Cl.
*G08B 13/14* (2006.01)
(52) U.S. Cl. .............................. 340/572.1; 340/572.3; 340/572.4; 340/10.5; 340/309.16; 235/375; 235/381; 235/385; 235/436; 235/451
(58) Field of Classification Search ............ 340/572.1, 340/572.3, 572.4, 10.5, 309.16; 235/375, 235/381, 385, 436, 451
See application file for complete search history.

(56) References Cited

U.S. PATENT DOCUMENTS

2003/0006281 A1 * 1/2003 Thomas et al. ............. 235/385

FOREIGN PATENT DOCUMENTS

| JP | 5-233643 | 9/1993 |
| JP | 9-288702 | 11/1997 |
| JP | 2003-6287 | 1/2003 |

* cited by examiner

*Primary Examiner*—Tai Nguyen
(74) *Attorney, Agent, or Firm*—Kratz, Quintos & Hanson, LLP

(57) ABSTRACT

An instruction drop-off warning system (1), which warns of drop-off of an instruction sheet (L) attached on a work (20) in a production line (40), comprises an IC tag (5a), which is incorporated in the instruction sheet L and is used for storing identification information, an instruction-management system (2), which manages the identification information of the instruction sheet (L) attached on the work (10) as instruction information (4), and a handy terminal (6), which includes a reader/writer (3) for reading and writing identification information from and into an IC tag (5b) and which stores the instruction information (4) received from the instruction-management system (2). In the instruction drop-off warning system, the handy terminal (6) is used for comparing the identification information being read from the instruction sheet (L) attached on the work (20), with the instruction information (4), so that a detection is made for warning whether or not any instruction sheet (L) has dropped off.

4 Claims, 9 Drawing Sheets

Fig. 6

| Product ID: * * * * * * * * * | |
|---|---|
| Instruction ID:123************ | Incomplete |
| Instruction ID:456************ | Incomplete |
| Instruction ID:789************ | Incomplete |
| Instruction ID:234************ | Incomplete |
| Instruction ID:567************ | Incomplete |

Fig. 8

| Product ID: * * * * * * * * * | |
|---|---|
| Instruction ID:123************ | complete |
| Instruction ID:456************ | complete |
| Instruction ID:789************ | complete |
| Instruction ID:234************ | Incomplete |
| Instruction ID:567************ | Incomplete |

INSTRUCTION DROP-OFF WARNING SYSTEM AND METHOD

FIELD OF THE INVENTION

The present invention relates to a system and a method for warning of a drop-off of an instruction sheet, which is attached on a work object.

BACKGROUND OF THE INVENTION

It is a general practice that products are assembled while they are being moved on a conveying device along a production line. The instructions of the procedure to be followed downstream along the line are conveyed by writing them on a sheet, which is attached on each product (work). Workers confirm their actions by reading the instructions, which list required operations (refer to, for example, Japanese Laid-Open Patent Publication No. 2003-6287 (pages 2-4, FIG. 1)).

However, if such an instruction sheet has dropped off from a work while the work is being conveyed along the production line, then the workers positioned downstream cannot determine what operations are required on the work. As a result, if workers miss some of the required operations, then missed operations are detected, for example, by an inspection on the work executed after the supposed completion. In this case, because of the missed operations, the work is returned for a reprocessing, which causes a problem of delay in the manufacturing process, resulting in a decrease in operational efficiency.

SUMMARY OF THE INVENTION

To solve such problems, it is an object of the present invention to provide a system and a method that can warn of a drop-off of such an instruction sheet.

An instruction drop-off warning system according to the present invention comprises identification-information storing means (for example, the IC tag 5a described in the following embodiment), instruction-information storing means (for example, the instruction-management system 2 described in the following embodiment), information-reading/writing means (for example, the reader/writer 3 described in the following embodiment), instruction-information adding means (for example, the instruction-information adding function S110 described in the following embodiment), removal-information writing means (for example, the instruction-removal information writing operation S120 described in the following embodiment), instruction-presence checking means (for example, the instruction-presence checking operation S130 described in the following embodiment), and warning means (for example, the warning operation S135 described in the following embodiment). The identification-information storing means is incorporated in an instruction sheet, which is used for conveying to a worker an operation to be performed on a work object, and enables the identification information of the instruction sheet to be read without any physical contact. The instruction-information storing means stores as instruction information the identification information of the instruction sheet, which is attached on the work object, in correspondence with management information of the work object. The information-reading/writing means reads or writes the identification information from or into the identification-information storing means of the instruction sheet, which is attached on the work object. The instruction-information adding means writes, in the instruction information, the identification information of the instruction sheet when the instruction sheet is attached to the work object. The removal-information writing means writes, in the instruction information, the identification information of the instruction sheet when the instruction sheet is removed from the work object. The instruction-presence checking means compares the identification information retrieved by the information-reading/writing means from the identification-information storing means, which is incorporated in the instruction sheet, with the instruction information, which is stored in the instruction-information storing means, and checks whether or not the instruction sheet has dropped off. The warning means warns of the drop-off of the instruction sheet if the instruction-presence checking means judges that the instruction sheet has dropped off.

In this system, the instruction information, which is managed by the instruction-information storing means, is compared with the identification information of the instruction sheet, which is attached on the work object. By this comparison, the system can detect easily if the instruction sheet has dropped off, and the system warns of the drop-off if it has happened. As a result, a prevention is made against the work object being returned for the operation that has been missed, improving production efficiency. The operation that checks if the instruction sheet has dropped off or not is easily executed because the retrieval of the identification information does not require any physical contact.

The instruction drop-off warning system may further comprise work-object information storing means (for example, the product ID IC tag 5b described in the following embodiment), which is attached on the work object and enables the management information of the work object to be read without any physical contact. In this case, the instruction information is stored and managed in the work-object information storing means.

By this arrangement, the instruction information is managed in the work-object information storing means, which is attached on the work object, so the information is managed in a bundle for each work object. As a result, the checking of the instruction sheet whether or not it has dropped off is made even easier.

An instruction drop-off warning method according to the present invention is for warning of a drop-off of an instruction sheet by using a system that comprises identification-information storing means, which is incorporated in an instruction sheet used for conveying to a worker an operation to be performed on a work object and which enables the identification information of the instruction sheet to be read without any physical contact, instruction-information storing means, which stores as instruction information the identification information of the instruction sheet attached on the work object in correspondence with the management information of the work object, and information-reading/writing means, which reads or writes the identification information from or into the identification-information storing means of the instruction sheet attached on the work object. This method comprises:

a step for writing, in the instruction information, the identification information of the instruction sheet when the instruction sheet is attached to the work object;

a step for writing, in the instruction information, the identification information of the instruction sheet when the instruction sheet is removed from the work object;

a step for checking whether or not the instruction sheet has dropped off, by comparing the identification information retrieved by the information-reading/writing means from the identification-information storing means, which is incorporated in the instruction sheet, with the instruction information, which is stored in the instruction-information storing means; and a step for warning of the drop-off of the instruction sheet if the checking step judges that the instruction sheet has dropped off.

BRIEF DESCRIPTION OF THE DRAWINGS

FIG. 6 is a diagram showing the data structure of the instruction information.

FIG. 8 is a diagram showing the data structure that results when the work has completed.

DESCRIPTION OF THE PREFERRED EMBODIMENTS

Now, a preferred embodiment according to the present invention is described in reference to the drawings. A system for warning of a drop-off of an instruction sheet according to the present invention utilizes Radio Frequency Identification (RFID) tag (hereinafter referred to as "IC tag") for detecting that an instruction sheet has dropped off, in order to warn of the drop-off, for example, in a production line, where work objects are attached each with an instruction sheet. The instruction sheet includes an IC tag and lists operations to be performed specifically on the respective work object by the workers positioned downstream along the line. At first, before describing the instruction drop-off warning system according to the present invention, a line for manufacturing vehicles, to which the system is applied, is described in reference to FIG. 1. The work objects dealt by this production line are vehicle bodies (works).

Figure 1:
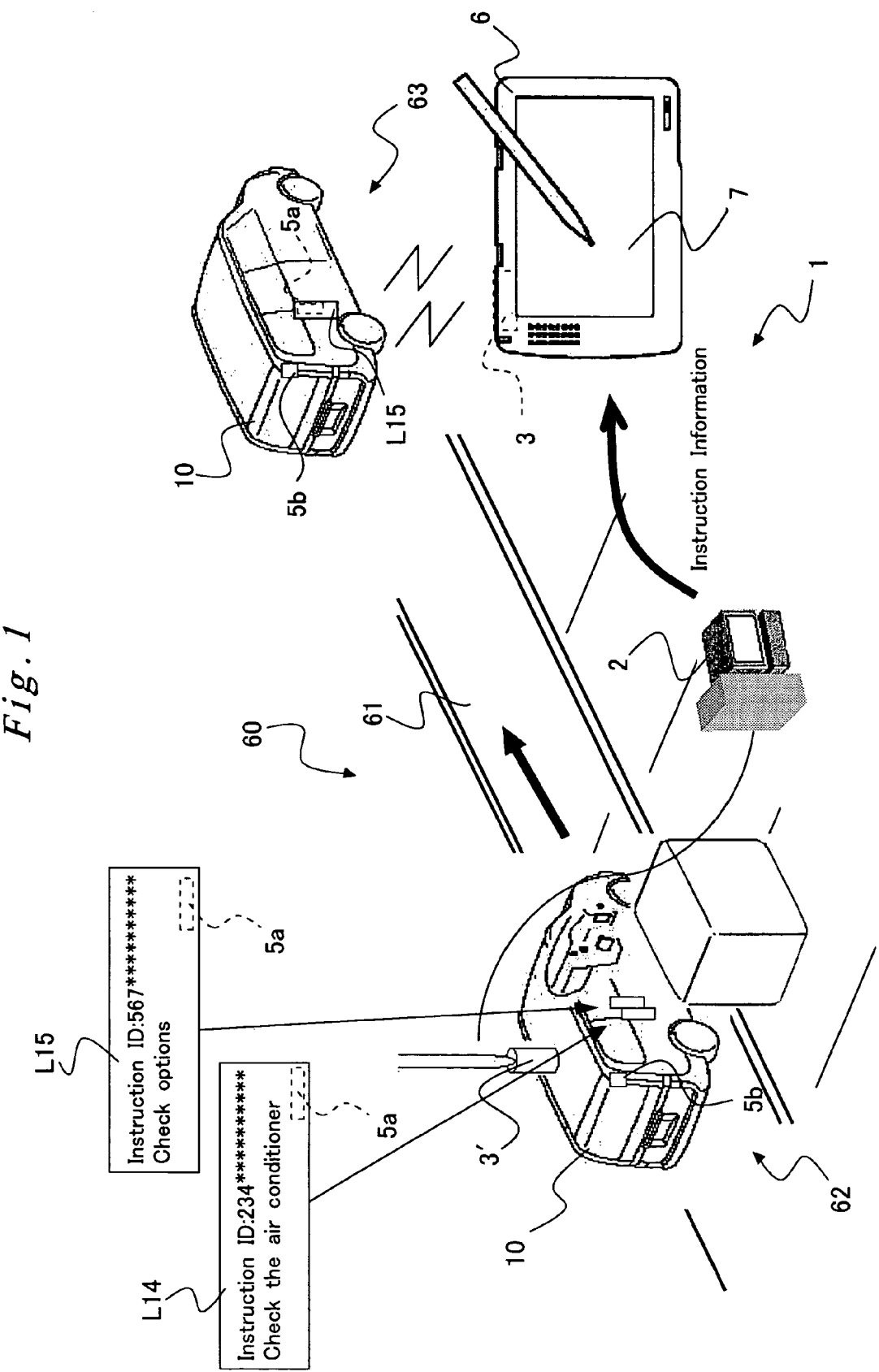
FIG. 1 is an illustration describing a line for manufacturing vehicles.

The production line 60 is used for assembling vehicle bodies (works 10). Along the production line, works 10 are placed successively one after another on a conveying device 61 and are moved along the line, and each work receives predetermined parts at predetermined assembly stations or stages, respectively. Though the products (vehicles) produced by the production line 60 are of an identical model, they have different specifications because they are to be equipped individually with various optional parts that are selected by respective customers. As a result, the operations performed as inspection, for example, at the last stage 63 of the production line may differ for each finished product. For this reason, the instructions required for the products are prepared on instruction sheets L (L14 and L15), which are attached to corresponding works 10 at an upstream stage 62 before the start of the assembly operations. The respective products, after the completion of the assembly, are examined in accordance with the instructions on the instruction sheets L at the inspection stage 63. Each instruction sheet L includes information for identifying the instruction (instruction ID) and a description of an operation, which is readable by a worker with naked eyes, as shown in FIG. 1.

Each instruction sheet L, beforehand, incorporates an IC tag 5a, which stores the identification information of the instruction sheet L as electronic data. The instruction sheet L is attached to the work 10 when an operation to be instructed for a downstream stage arises, and it is detached from the work 10 when the operation has been completed or becomes unnecessary. The information of the attachment and detachment of the instruction sheet L to and from the work 10 is managed by an instruction-management system 2 on the basis of the identification information of the instruction sheet L. It is not necessary to time the attachment or detachment of the instruction sheet L to or from the work 10 for storing the information of the attachment and detachment into instruction information 4. The action of the attachment or detachment of the instruction sheet L and the storing of that information may be executed simultaneously, or the identification information of the instruction sheet L may be stored into the instruction information 4 at a stage more downstream than the real action of the attachment or detachment.

The instruction drop-off warning system 1 stores the instruction information, which is managed by the instruction-management system 2, into a handy terminal 6, and the instruction drop-off warning system 1 uses the handy terminal 6 at the inspection stage 63 for checking if there is a drop-off of an instruction sheet L. The reading of the information in an IC tag 5 by the handy terminal 6 is executed by a reader/writer 3 without any physical contact.

Figure 2:
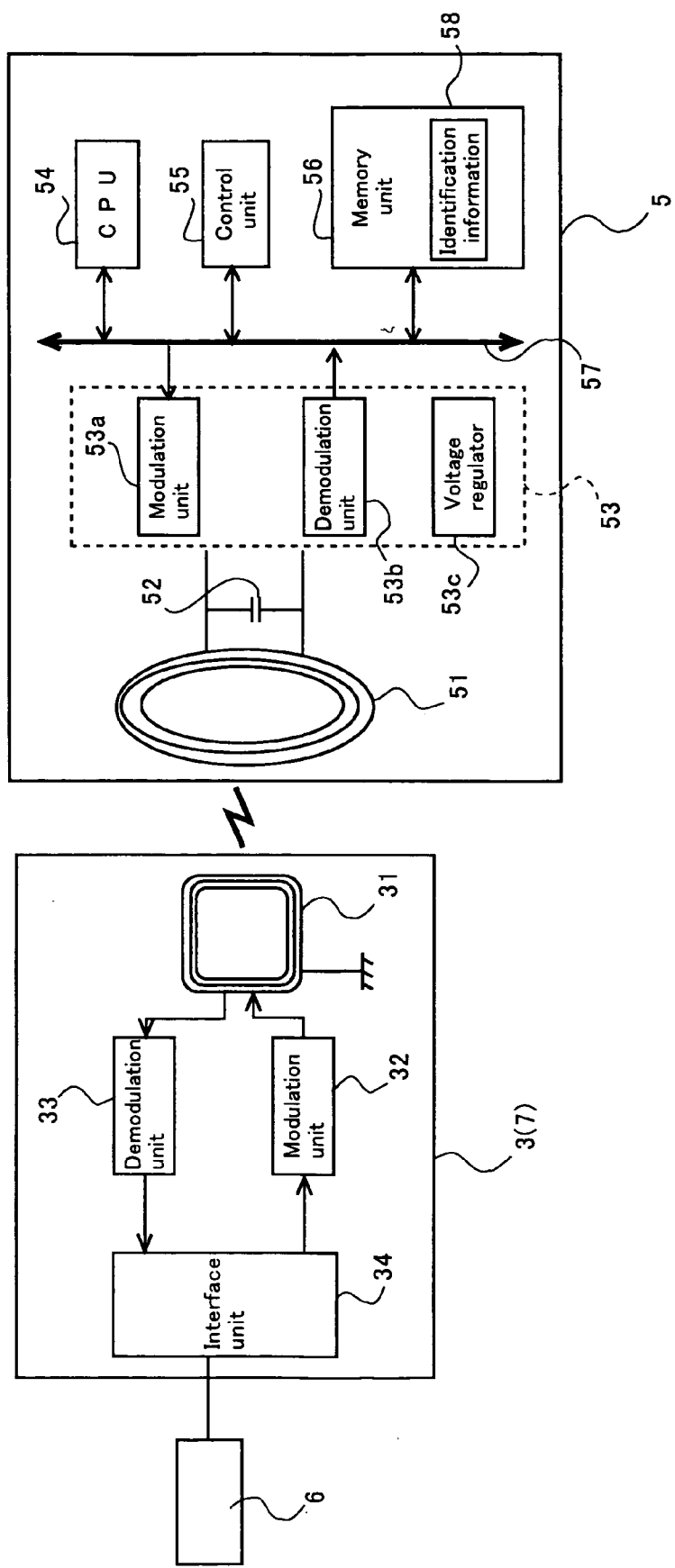
FIG. 2 is a block diagram describing the construction of an ID tag and a reader/writer.

At first, the IC tag 5 and the reader/writer 3 are described. As shown in FIG. 2, the IC tag 5 comprises an antenna 51, a condenser 52 and an IC chip, which incorporates other circuits as an integrated circuit. The IC tag 5 communicates with the reader/writer 3 by electromagnetic waves such as radio waves and microwaves. The IC chip includes an interface section 53, a CPU 54, a control unit 55 and a memory unit 56, which are connected to one another through an internal bus 57.

The reader/writer 3, which communicates with the IC tag 5 for writing to and reading from the memory unit 56, comprises a modulation unit 32 and a demodulation unit 33, which are connected, respectively, to an antenna 31. The reader/writer 3 is connected through an interface unit 34 to the instruction-management system 2 or the handy terminal 6.

On the one hand, when the reader/writer 3 receives, for example, a command for writing data (write command) from the handy terminal 6, the data together with the write command pass through the interface unit 34 to the modulation unit 32, where they are modulated into transmission signals. The signals are transmitted in electromagnetic wave from the antenna 31 of the reader/writer 3 and received by the IC tag 5 through a resonant circuit, which comprises the antenna 51 and the condenser 52. The received signals pass through the interface section 53, where the signals are demodulated by a demodulation unit 53b into the write command and the data. In response to the write command, the CPU 54 processes a control program stored in the control unit 55 for storing the data (identification information 58) into the memory unit 56.

On the other hand, when the reader/writer 3 receives a command for reading data (read command) from the handy terminal 6, the read command is modulated and transmitted in the same way as described above. In the IC tag 5, the read command is executed for retrieving the data (identification information 58), which is stored in the memory unit 56. The data are passed through a modulation unit 53*a*, and the modulated signals are transmitted from the antenna 51. The signals received by the reader/writer 3 are passed through the demodulation unit 33 and are handed to the handy terminal 6.

By the way, the interface section 53 of the IC tag 5 includes a voltage regulator 53*c*, which stabilizes the electrical current being induced by the radio waves transmitted from the reader/writer 3 and supplies it in direct current for driving the respective units.

The IC tag 5 is operated mainly by radio (electromagnetic wave) such that data are read from and written to the memory unit 56 of the IC tag 5 without any physical contact. The IC tag 5 is activated by the electricity induced by the electromagnetic waves radiated by the reader/writer 3, so it does not require any battery as power source. In addition, the IC tag 5 is extremely small and compact as it is constructed in an IC chip. This enables the use of the IC tag 5 as described above, where it is attached to the instruction sheet L (embedded in the instruction sheet L by placing it between two sheets of paper and pasting the sheets to each other).

Figure 3:
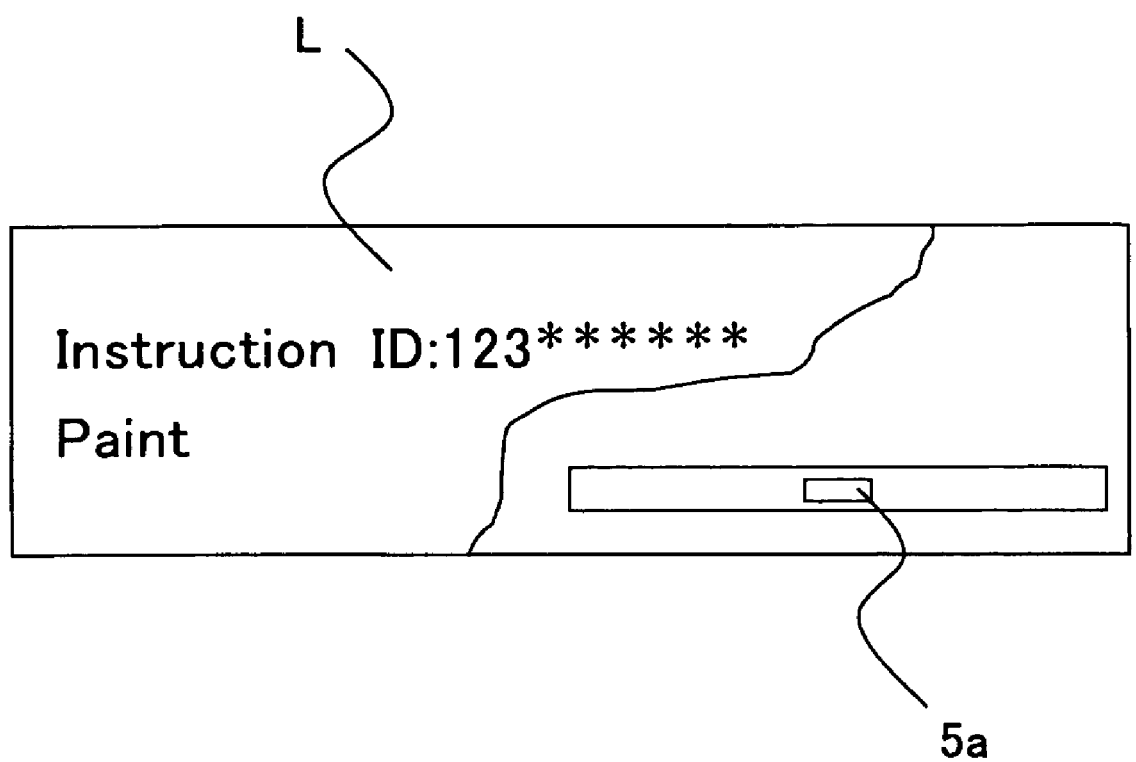
FIG. 3 is an illustration describing an instruction sheet.
Figure 4:
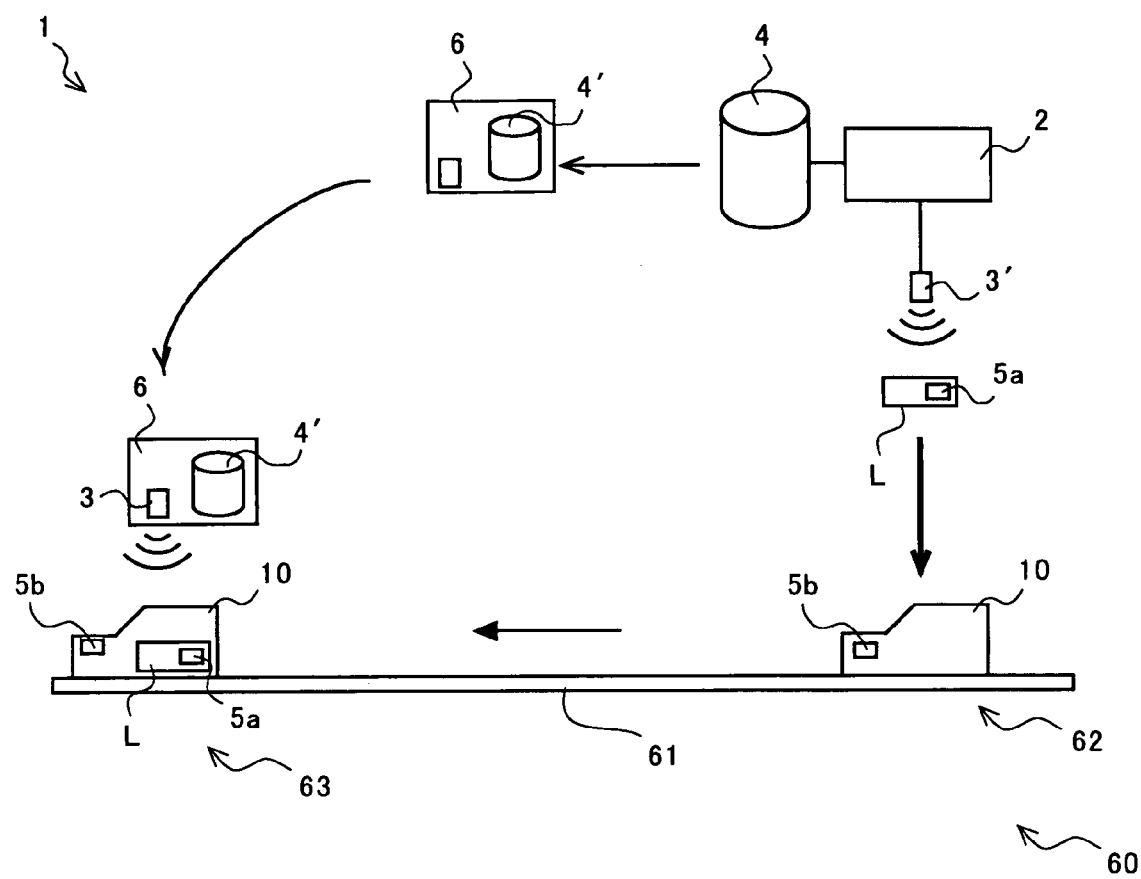
FIG. 4 is a block diagram describing an instruction drop-off warning system according to the present invention.

Now, an example is detailed for applying the instruction drop-off warning system 1 to a process for manufacturing vehicles in reference additionally to FIG. 4, where the parts that are identical to those shown in FIG. 1 are indicated with the same numbers for leaving out redundant explanation. As described in reference to FIG. 3, the instruction sheet L is written with identification information and instructions in characters, and the identification information is stored in the IC tag 5 as electronic data. In a case where an instruction sheet L is attached to a work 10 at an upstream stage 62, the identification information of the instruction sheet L is entered to the instruction-management system 2, which manages it as instruction information 4.

Figure 5:
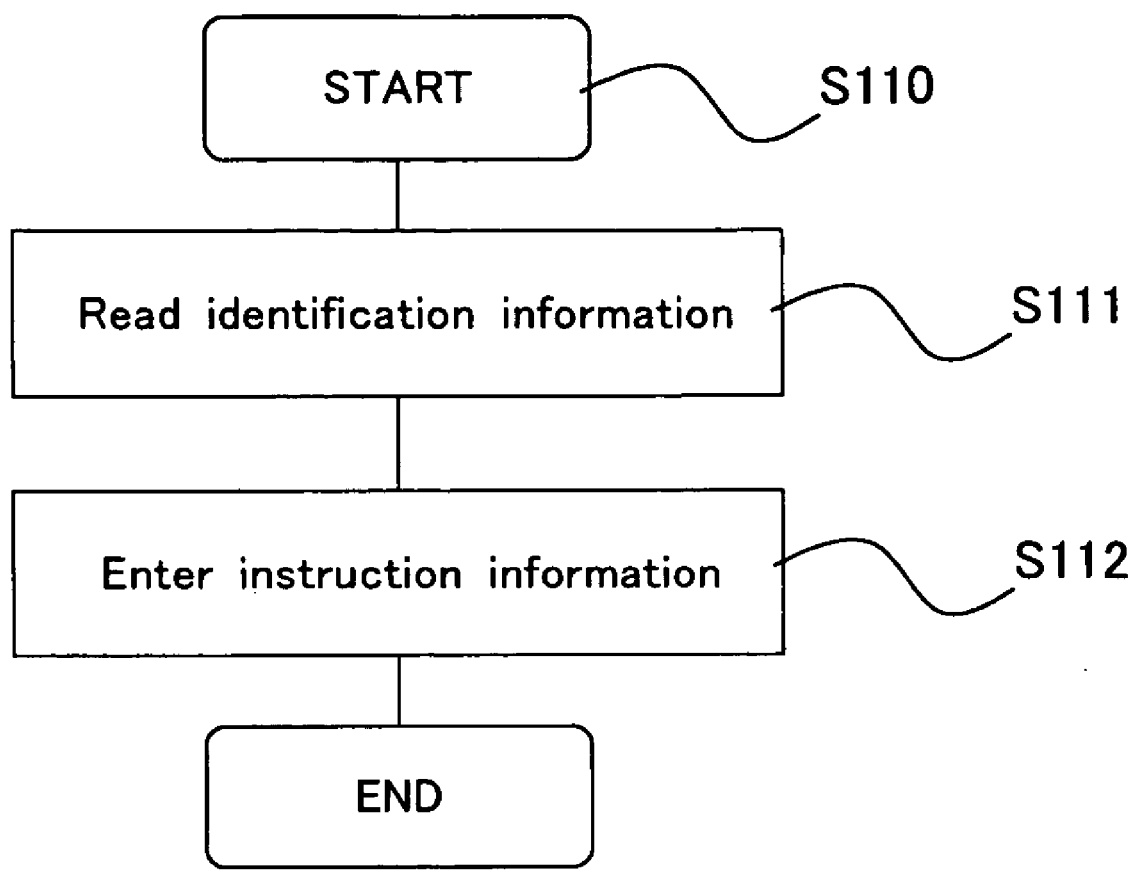
FIG. 5 is a flow chart showing steps for adding information to the current instruction information.

A function S110 for adding the information of an instruction sheet L to the instruction information 4 can comprise steps that are shown in FIG. 5. At first, the identification information stored in an IC tag 5*a* is read by a reader/writer 3', which is connected to the instruction-management system 2 (S111), and the identification information retrieved is then stored into the instruction information 4 (S112). Of course, the same effect can be achieved manually by a worker, who reads the identification information (instruction ID) written on the instruction sheet L and enters it to the instruction-management system 2.

In addition, a product ID is attached to each work 10 for managing the work 10, individually. In this embodiment, an IC tag 5*b* stores the product ID, and this IC tag 5*b* for product identification is attached to the work 10. Therefore, the instruction sheet L attached on each work 10 is managed by the instruction information 4 on the basis of the product ID. FIG. 6 shows five instruction sheets L as an example of data structure of the instruction information 4, in which the operations instructed by the instruction sheets L are managed with their states whether they have been completed or not in correspondence to the respective identification information. FIG. 6 shows a case where all the operations are not yet finished, with each instruction being labeled "incomplete".

Figure 7:
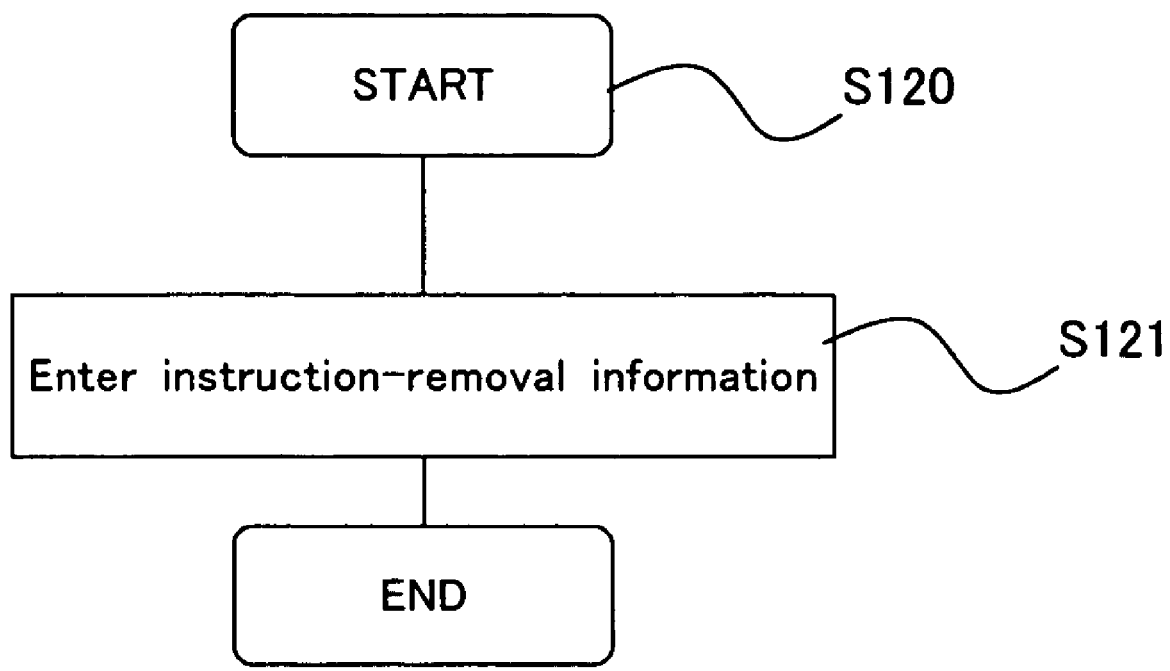
FIG. 7 is a flow chart showing a step of writing removal information.

On the other hand, in the manufacturing process, when the operation instructed by an instruction sheet L comes to completion or becomes unnecessary, this information is reflected on the instruction information 4 in the instruction-management system 2. When the operation is finished, the instruction sheet L may be removed from or may be left attached on the respective work 10. However, the following description assumes that the instruction sheet L be removed from the work after the completion of the operation. In this case, the identification information of the instruction sheet L that has been removed (or whose operation has been completed) is written into the instruction information 4 by an instruction-removal information writing operation S120, which follows such a procedure as shown in FIG. 7 (S121). The identification information of the instruction sheet L that has been removed from the work may be read by the reader/writer as described above or by a worker, who directly enters the same information to the instruction-management system 2. As the instruction sheets L are removed in this way, FIG. 8 shows that the first three operations have been completed since the condition shown in FIG. 6. The identification information of the instruction sheets L that have been already removed (and whose operations are "complete") are not referred in the checking of the instruction sheets L whether there is a drop-off (instruction-presence checking operation S130), which will be described below. The identification information of the instruction sheet L removed may be managed in connection to the state of the corresponding operation in this way, or the data that correspond to the identification information of the removed sheet may be deleted from the instruction information 4 without keeping the state of the operation.

Figure 9:
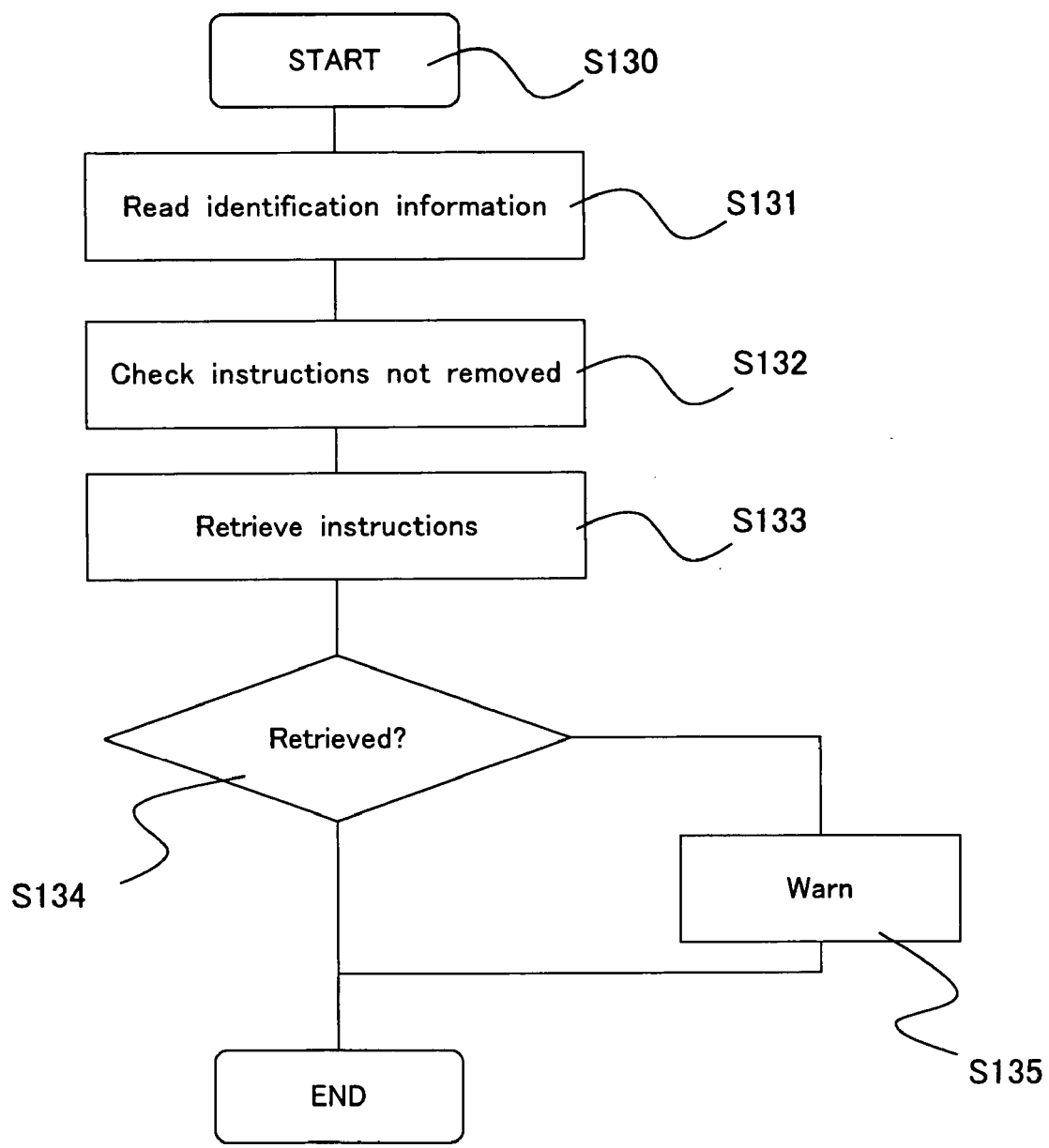
FIG. 9 is a flow chart showing steps for confirming the presence of an instruction sheet.

As described above, the instruction sheet L attached on the work 10 is managed by the instruction-management system 2, and the state of the instruction sheet L is recorded in the instruction information 4. Prior to the inspection stage 63, the instruction information 4 is retrieved into the handy terminal 6 as check information 4'. The data structure of the check information 4' is identical with that of the instruction information 4. In this case, the handy terminal 6 and the instruction-management system 2 are connected with each other for data transfer, for example, by a network. The handy terminal 6, which has the instruction information 4 as check information 4', is used for checking the instruction sheets L whether there is a drop-off at the inspection stage 63. Since the identification information of the instruction sheet L is stored in the IC tag 5*a*, which is incorporated in the instruction sheet L as described above, the handy terminal 6 is designed also capable of retrieving the identification information from the IC tag through the reader/writer 3 without any physical contact. Now, the instruction-presence checking operation S130, which checks whether or not an instruction sheet L has dropped off, is described in reference to FIG. 9.

At first, the product ID is read from the IC tag 5*a* for product identification, which is attached on the work 10, by using the reader/writer 3 (S131), and for this product ID, the states of the instruction sheets L are read from the check information 4' (S132). For example, for the case shown in FIG. 8, the information of the states labeled with "incomplete" is retrieved. Then, the identification information is read from the instruction sheets L that are still attached on the work 10 by using the reader/writer 3 (S133). At this time, the instruction sheet L can be read by the handy terminal 6 as long as it has not dropped off from the work. In other words, if it has dropped off, then its identification information cannot be read. On this basis, a comparison is made between the identification information of the instruction sheets labeled "incomplete" in the check information 4' and the identification information of the instruction sheets L read by the reader/writer 3. If one does not match the other, then it is judged that an instruction sheet L has dropped off (S134). If the judgment is that an instruction sheet L has dropped off, then a warning is displayed on the display 7 (refer to FIG. 1) of the handy terminal 6 (Sl35).

For example, at the upstream stage 62 shown in FIG. 1, the two instruction sheets L14 and L15 that are shown in FIG. 8 as incomplete are attached on the work 10. If instruction sheet L14 drops off on the way along the production line, then only the instruction presented on instruction sheet L15 is conveyed to a worker at the inspection stage 63. In this instance, if the handy terminal 6 is used for checking the instruction sheet whether there is a drop-off, because only the identification information of instruction sheet L15 is read by the handy terminal 6, a warning is displayed by the warning operation S135 as described above. The worker can recognize that instruction sheet L14 has dropped off.

In the above described embodiment, the instruction information 4 is managed in the instruction-management system 2. However, the instruction information may be managed in the IC tag 5b used for product identification. In this case, it is unnecessary to retrieve the contents of the instruction information 4 from the instruction-management system 2 to the handy terminal 6 as check information 4'. Instead, for achieving the same effect, the identification information of the instruction sheets L that are attached on the work 10 and labeled "incomplete" is read in connection to the product ID at the operation S131 shown in FIG. 9. In this case, the whole system is arranged such that reader/writers 3' are provided at a plurality of stages along the production line 60 as shown in FIG. 1, and these reader/writers are used for writing and managing the identification information of the instruction sheets L attached on the work 10 into the product ID IC tag 5b as instruction information.

What is claimed is:

1. An instruction drop-off warning system comprising:
   identification-information storing means, which is incorporated in an instruction sheet used for conveying to a worker an operation to be performed on a work object and which enables identification information of said instruction sheet to be read without physical contact;
   instruction-information storing means, which stores as instruction information said identification information of said instruction sheet attached on said work object in correspondence with management information of said work object;
   information-reading/writing means, which reads or writes said identification information from or into said identification-information storing means of said instruction sheet attached on said work object;
   instruction-information adding means, which writes, in said instruction information, said identification information of said instruction sheet when said instruction sheet is attached to said work object;
   removal-information writing means, which writes, in said instruction information, said identification information of said instruction sheet when said instruction sheet is removed from said work object;
   instruction-presence checking means, which compares said identification information retrieved from said identification-information storing means of said instruction sheet by said information-reading/writing means with said instruction information stored in said instruction-information storing means and checks if said instruction sheet has dropped off; and
   warning means, which warns of the drop-off of said instruction sheet if said instruction-presence checking means judges that said instruction sheet has dropped off.

2. The instruction drop-off warning system set forth in claim 1, wherein:
   said identification-information storing means comprises an IC tag that includes an antenna, an interface unit, a CPU, a control unit and a memory unit, which are connected through an internal bus; and
   said information-reading/writing means comprises a reader/writer, which communicates with said IC tag through said antenna by electromagnetic waves such as radio waves and microwaves, and reads and writes, without physical contact, said identification information in said identification-information storing means incorporated in said instruction sheet.

3. The instruction drop-off warning system set forth in claim 1, further comprising work-object information storing means, which is attached on said work object and enables said management information of said work object to be read without physical contact, wherein:
   said instruction information is stored and managed in said work-object information storing means.

4. An instruction drop-off warning method for warning of a drop-off of an instruction sheet by using a system that comprises identification-information storing means, which is incorporated in an instruction sheet used for conveying to a worker an operation to be performed on a work object and which enables identification information of said instruction sheet to be read without physical contact, instruction-information storing means, which stores as instruction information said identification information of said instruction sheet attached on said work object in correspondence with management information of said work object, and information-reading/writing means, which reads or writes said identification information from or into said identification-information storing means of said instruction sheet attached on said work object; wherein said method comprises:
   a step for writing, in said instruction information, said identification information of said instruction sheet when said instruction sheet is attached to said work object;
   a step for writing, in said instruction information, said identification information of said instruction sheet when said instruction sheet is removed from said work object;
   a step for checking whether or not said instruction sheet has dropped off, by comparing said identification information retrieved from said identification-information storing means of said instruction sheet by said information-reading/writing means with said instruction information stored in said instruction-information storing means; and
   a step for warning of the drop-off of said instruction sheet if said checking step judges that said instruction sheet has dropped off.

* * * * *